United States Patent

Nygaard

[11] Patent Number: 5,522,433
[45] Date of Patent: Jun. 4, 1996

[54] REUSABLE INSULATION JACKET FOR TUBING, FITTINGS AND VALVES

[76] Inventor: Noble A. Nygaard, 1067 Coulee Trail, Roberts, Wis. 54023

[21] Appl. No.: 510,009

[22] Filed: Aug. 1, 1995

Related U.S. Application Data

[63] Continuation-in-part of Ser. No. 68,384, May 28, 1993, and a continuation of Ser. No. 99,943, Jul. 30, 1993, abandoned.

[51] Int. Cl.$^6$ ................................................. F16L 59/16
[52] U.S. Cl. .................. 138/149; 138/110; 138/128; 137/375; 428/100
[58] Field of Search ................................ 138/149, 110, 138/128, 177, 178, 147; 137/375; 428/100

[56] References Cited

U.S. PATENT DOCUMENTS

| | | | |
|---|---|---|---|
| 2,070,861 | 2/1937 | Gillies | 138/128 |
| 3,941,159 | 3/1976 | Toll | 138/147 |
| 4,112,967 | 9/1978 | Withem | 138/149 |
| 4,142,565 | 3/1979 | Plunkett | 138/149 |
| 4,207,918 | 6/1980 | Burns et al. | 138/149 |
| 4,556,082 | 12/1985 | Riley et al. | 138/149 |
| 4,807,669 | 2/1989 | Prestidge | 137/375 |
| 4,930,543 | 6/1990 | Zuiches | 137/375 |
| 4,985,942 | 1/1991 | Shaw | 138/128 |
| 5,025,836 | 6/1991 | Botsolas | 138/128 |
| 5,055,334 | 10/1991 | Lechuga | 138/149 |

Primary Examiner—James E. Bryant, III
Attorney, Agent, or Firm—Palmatier, Sjoquist & Helget

[57] ABSTRACT

A reusable insulation jacket for tubing elbow and valve connectors carrying extreme hot and cold materials comprises a polygonal fiberglass mat. The mat is stitched to form a cavity as to completely receive the tubing connector and to overlap itself whereat complimentary releasable fastening hook and loop material securely hold the mat in place to insulate the tubing connector from fire and to prevent an individual from otherwise being burned from contacting the connector.

13 Claims, 5 Drawing Sheets

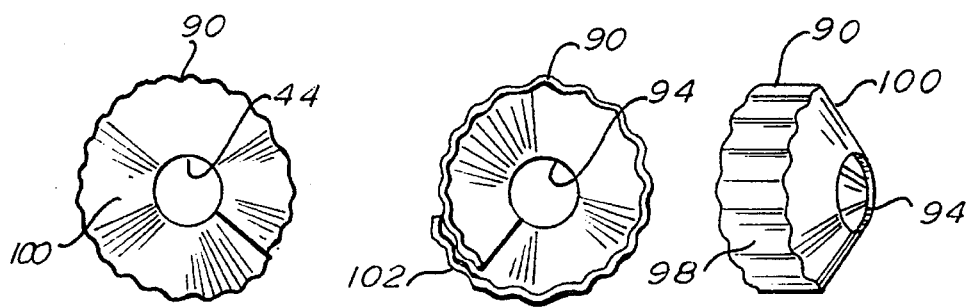
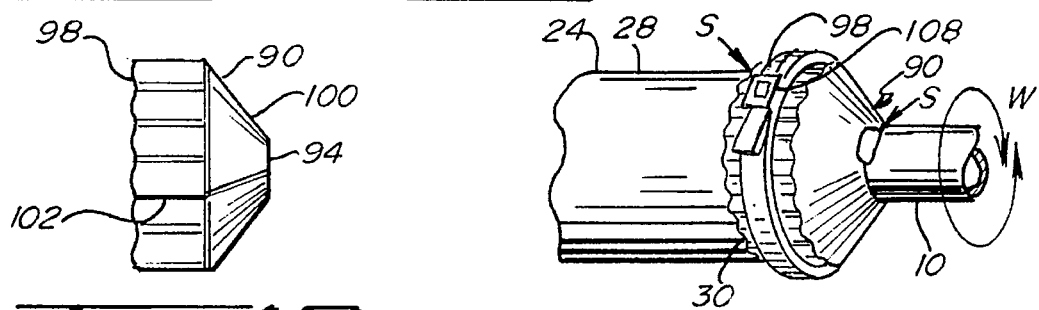
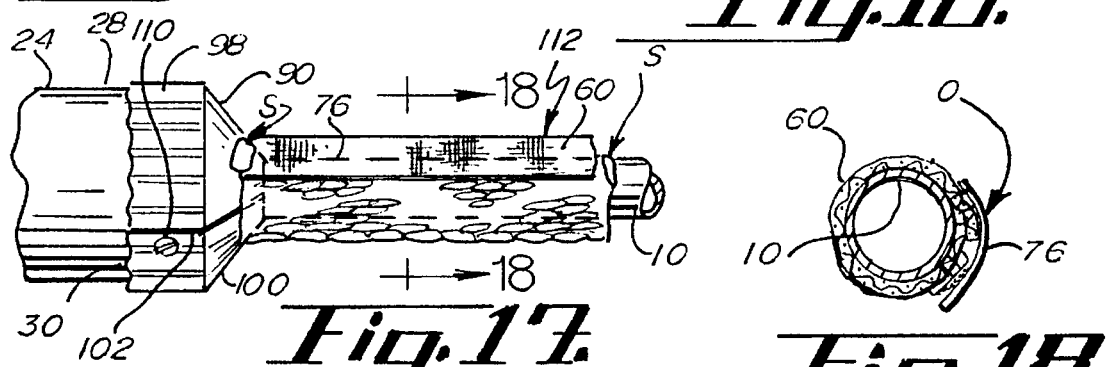
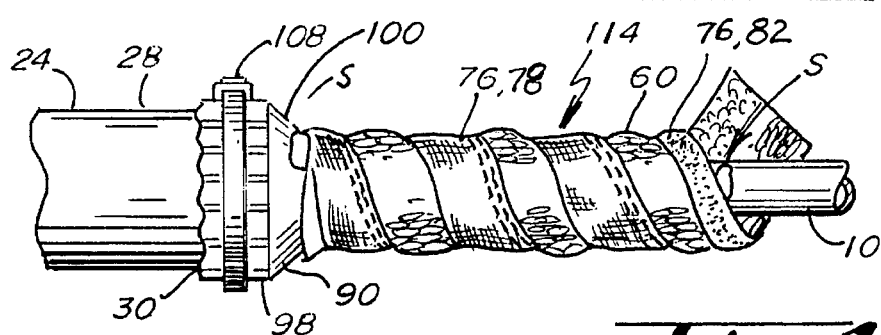

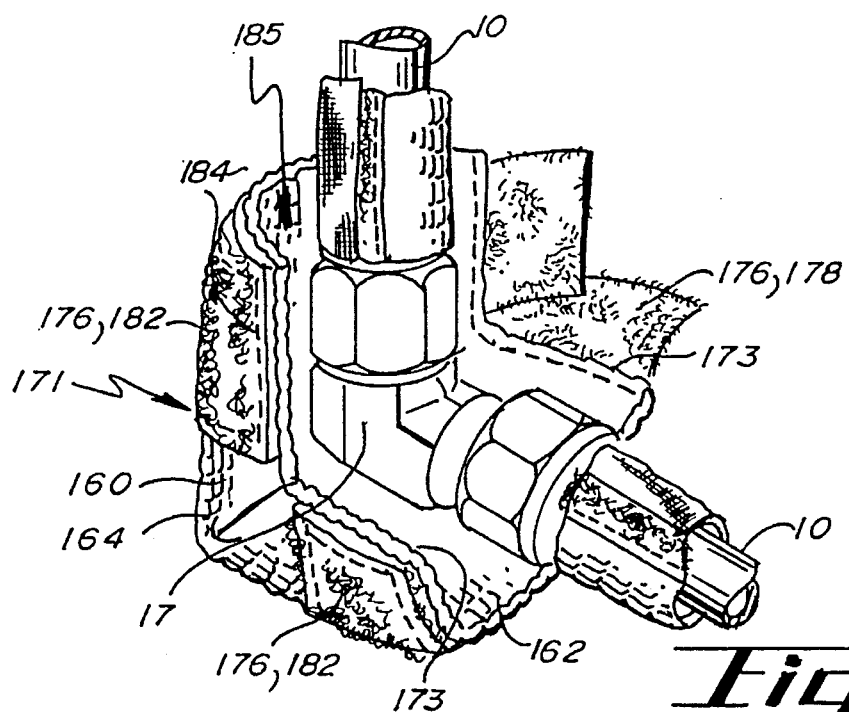
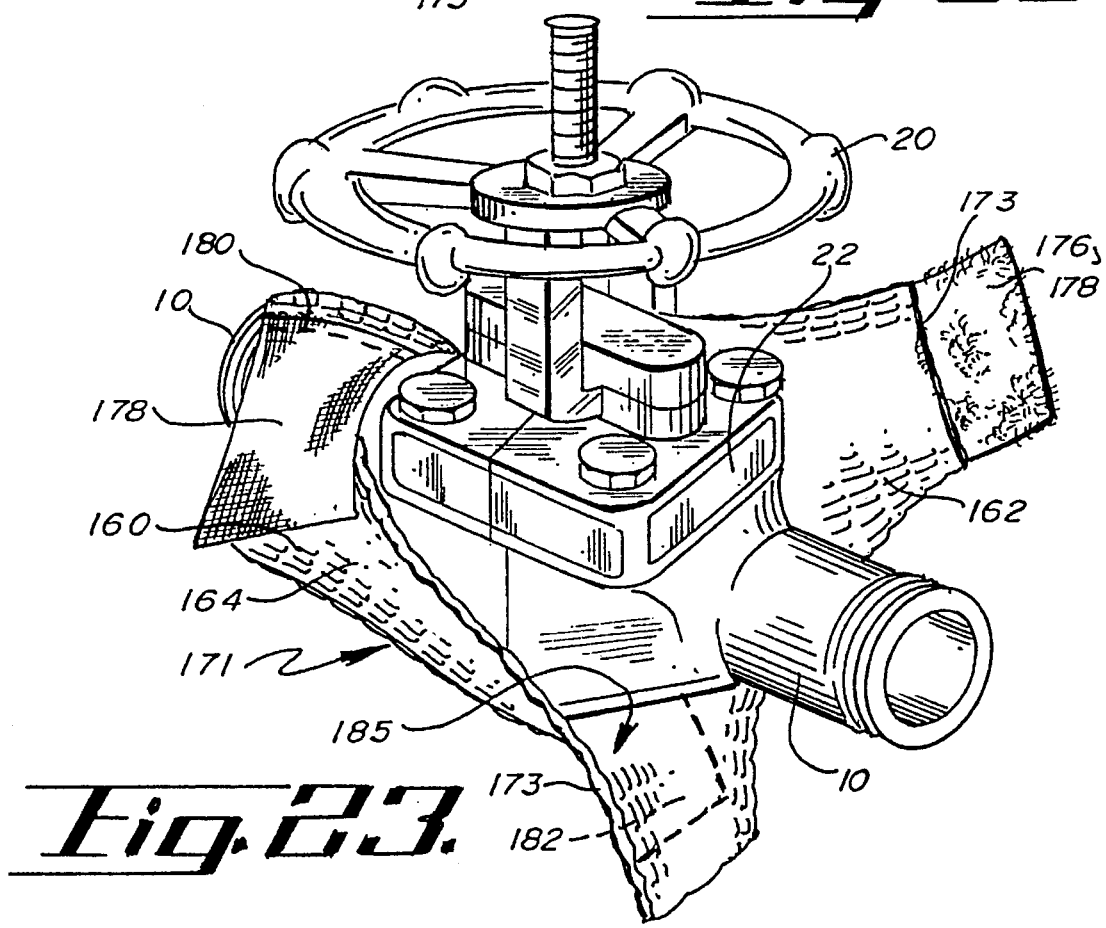

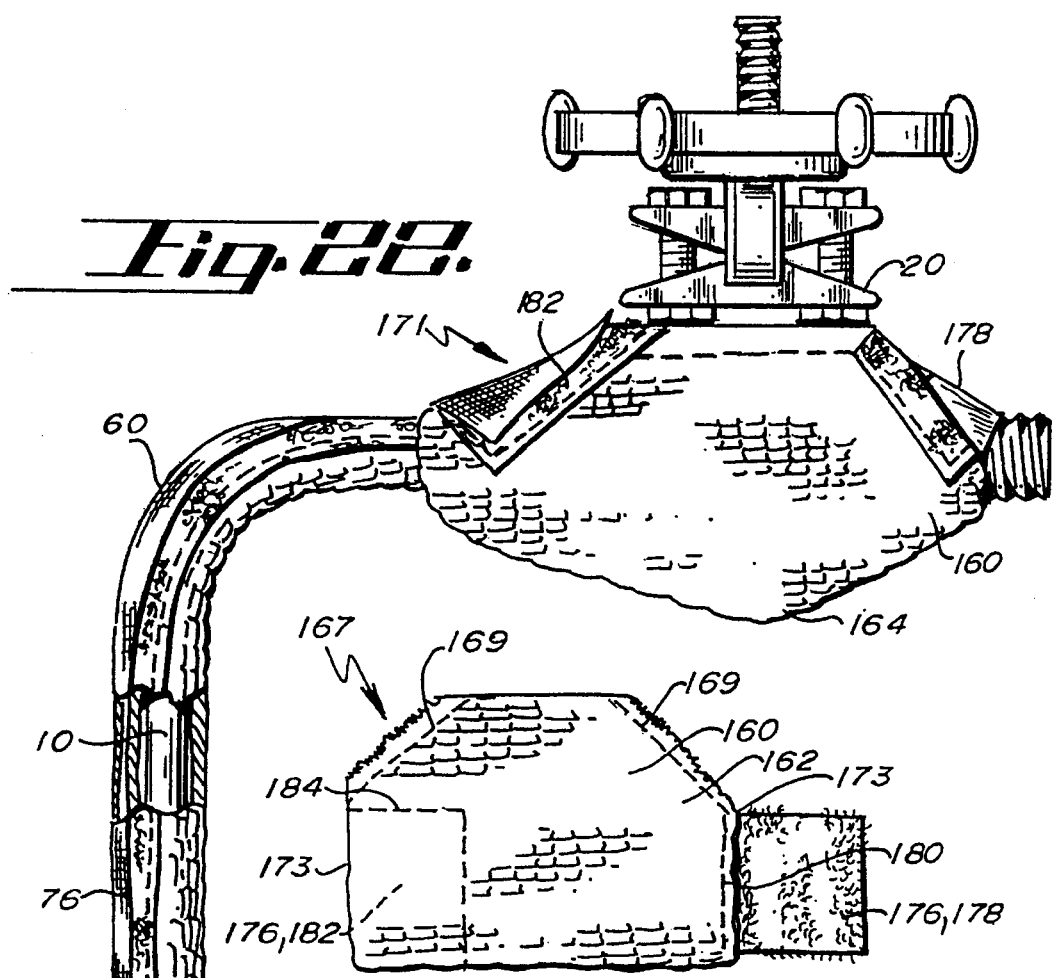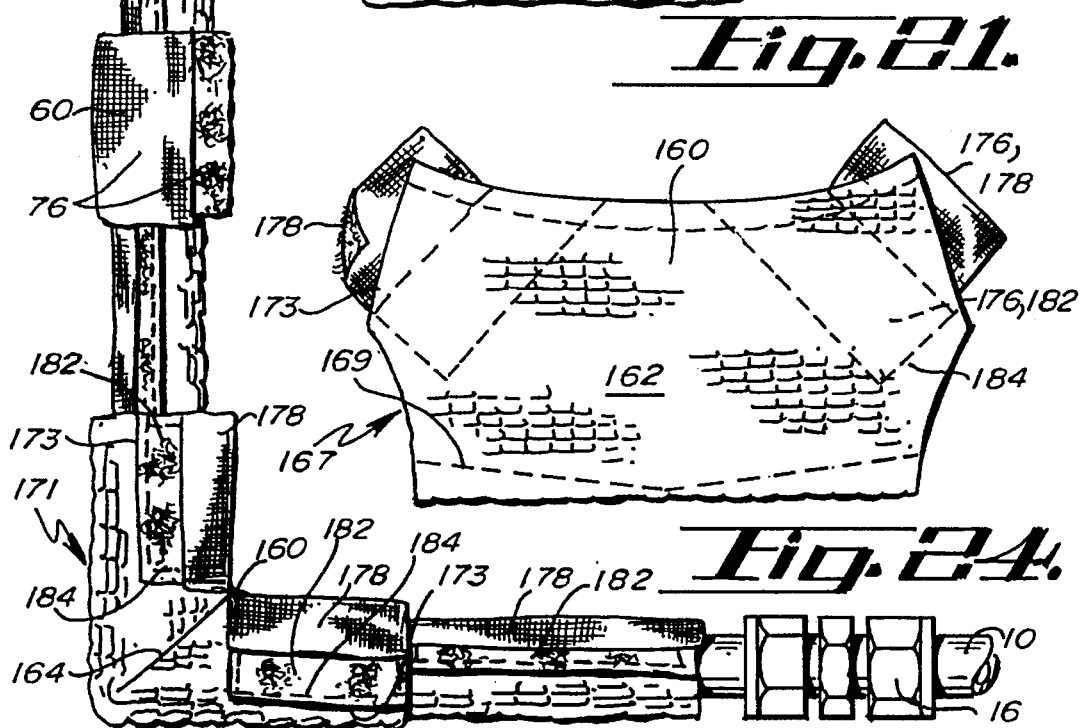

REUSABLE INSULATION JACKET FOR TUBING, FITTINGS AND VALVES

This invention is a continuation-in-part of co-owned U.S. patent application Ser. No. 08/068,384 filed on May 28, 1993 and this is a continuation of U.S. patent application Ser. No. 08/099,943, filed Jul. 30, 1993, under 37 CFR § 1.62, now abandoned.

BACKGROUND OF THE INVENTION

This invention relates to an insulation jacket for tubing, fittings and valves, and more particularly, to a reusable insulation jacket for tubing, fittings and valves which conveys steam, heated humid air or mist, hot materials, condensate, lubricants, cryogenic fluids and cold materials typically used ill heating and air conditioning, power facilities, food processing facilities and petrochemical facilities.

While cryogenic fluids approach absolute zero, steam for use in power may typically range between 270° F. and 300° F. These temperatures will easily burn an individual should they come in contact with either of these materials or the tubing, piping, conduiting, fittings and valves transporting such materials or steam.

Such extreme temperature steam and cold materials conveyed in tubing are common in industrial applications, such as boilers and petrochemical plants, and typically requiring insulation about the tubing. Asbestos is no longer used. While fiberglass insulation materials may indeed be used, known applications are generally not very sophisticated and require substantial installation time and further treatment for preservation of the insulation against weather, moisture and other harsh chemicals.

Consequently, preinsulated tubing has been developed and is commonly used as shown in prior art FIGS. 1 through 6. More specifically, the tubing 10 may be of a copper or steel for extremely high temperatures and aluminum or plastic for lower temperatures. Illustratively, tubing 10 may convey steam to a steam engine 12, which may be a boiler, tank or some other vessel. Tubing 10 is connected to the steam engine 12 by way of entrance fittings 14. It is common for the tubing 10 to be repeatedly spliced and reconnected by splice connectors 16. The source of the steam for tubing 10 may be a steam manifold 18. Controlling the steam into the tubing 10 may be done by way of a valve 20.

Preinsulated tubing 10 is commercially available from Parker-Hannifin Corporation of Ravenna, Ohio, marketed under the Paraflex Division. Such tubing 10 commonly has a preinsulation 24 thereover comprised of fiberglass layers 26 covered by a plastic jacket 28 which may be polyvinylchloride, polyethylene or the like. At the preinsulation end 30 emerges tubing 10.

A tube splice 34 is common and illustrated in prior art FIGS. 1 through 3. A tube splice 34 comprises tubing 10 extending from the preinsulation ends 30 and being joined by splice connectors 16. Commonly, a woven fiberglass sheet 36, with or without a self-sticking, plastic wrap-backing, is woven about the tube splice 34. Thereafter, a vinyl tape 38 may be wrapped around the tube splice 34 to seal the fiberglass sheet 36 in a waterproof manner.

In another arrangement, tube 10 may terminate in an end 44 appropriate for connection to a steam engine 12 by way of entrance fittings 14 shown in FIGS. 1 and 4 through 6. At the preinsulation end 30, commonly the fiberglass 26 is cut out 46 and filled in a sealing manner with uncured or unvulcanized silicone fill 48. After curing, a woven fiberglass tape 50 may be wrapped in spiral fashion around the tube 10 and secured by wire or tie fasteners 52. Thereafter, a thick waterproof latex paint, such as Mastik, may be painted over the fiberglass 50 as to waterproof and seal the fiberglass insulation 50.

These prior known methods of insulating tube splices and tube ends are extremely time consuming. Furthermore, the completed insulation and sealing of tube splices or tube ends becomes permanent and requires significant effort to again access the tubing.

There is a significant need for a reusable, easy-to-use fiberglass mat jacket that is presealed and which will readily cover tubing in an easy fashion in application and removal.

SUMMARY OF THE INVENTION

A reusable insulation jacket for splicing and termination of industrial tubing, fittings and valves carrying extreme hot and cold materials comprises a fiberglass mat. The mat is of a width as to completely wrap the tubing, fitting or valve and overlap itself whereat complimentary releasable fastening means securely hold the mat in place to insulate the tubing, fitting or valve from fire and to prevent an individual from otherwise being burned from contacting the tubing, fitting or valve.

A principal object and advantage of the present invention is that the reusable insulation jacket is simple to apply, easy to remove and furthermore reusable.

Another object and advantage of the present invention is that it may be used to protect bare tubing, tube splices, tube ends, fitting and valves.

Another object and advantage of the present invention is that it is relatively inexpensive to manufacture and saves a significant amount of man hours in both application and reusable removal.

Other objects and advantages will become obvious with the reading of the following specification and appended claims with a review of the Figures.

BRIEF DESCRIPTION OF THE DRAWINGS

FIG. 12 is the opposite side elevational view of the adaptor;

FIG. 13 is a front elevational view of the adaptor;

FIG. 14 is a rear elevational view of the adaptor;

FIG. 15 is a perspective view of the adaptor;

FIG. 16 is a perspective view of the adaptor fastened onto the preinsulated end of preinsulated tubing;

FIG. 17 is a front elevational view of the adaptor and fiberglass mat or jacket secured in straight arrangement to the preinsulated tubing;

FIG. 18 is a cross-sectional view taken along lines 18—18 of FIG. 17;

FIG. 19 is a front elevational view of a preinsulated tube insulated and sealed by the fiberglass mat in spiral fashion together with the adaptor;

FIG. 20 is a perspective view of an elbow fitting with the jacket and fastening means beginning to be fitted over the elbow;

FIG. 21 is an inside out plan view of the elbow fitting jacket and fastening means;

FIG. 22 is an elevational view of a tubing, fitting and valve arrangement insulated and protected with the present invention;

FIG. 23 is a perspective view of a valve with the jacket and fastening means beginning to be fitted over the valve body; and FIG. 24 is an inside out plan view of the valve jacket and fastening means.

DETAILED SPECIFICATION

Figure 1:
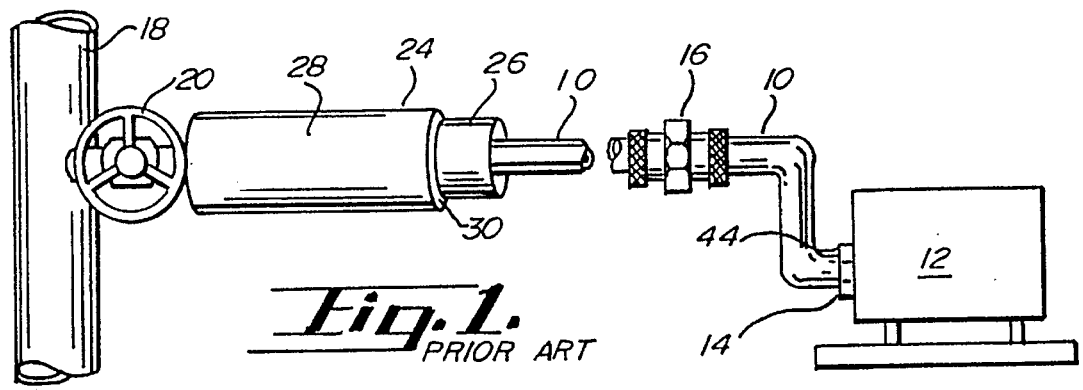
FIG. 1 is a partially schematic prior art view from a steam manifold to a steam engine.
Figure 2:
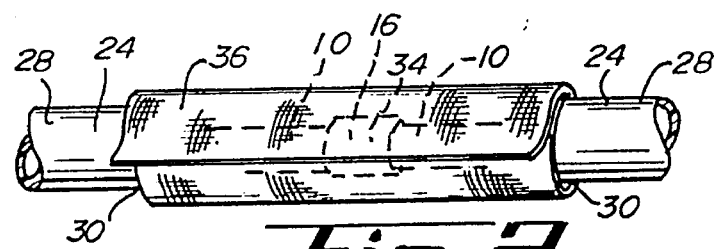
FIG. 2 is a front elevational prior art view of a partially spliced preinsulated tube.
Figure 3:
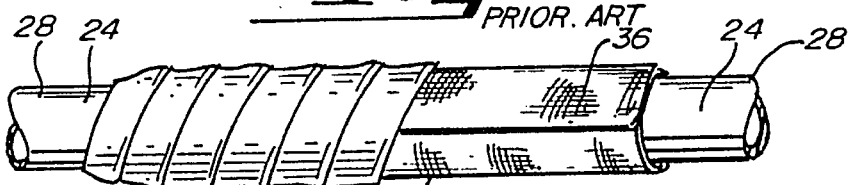
FIG. 3 is a front elevational prior art view of a nearly completed splice of preinsulated tubing.
Figure 4:
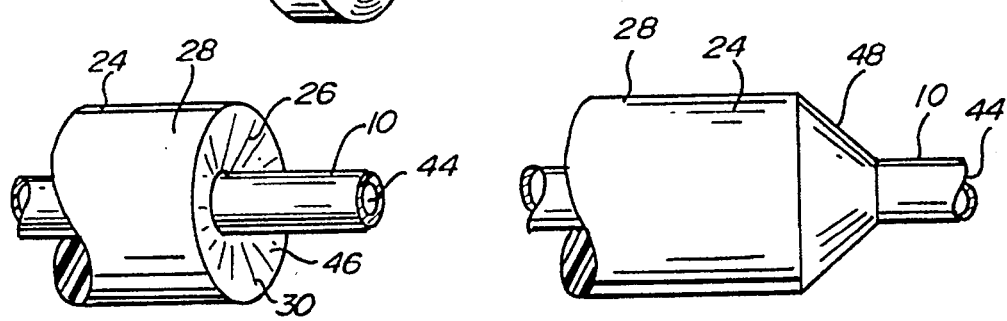
FIG. 4 is a perspective prior art view of a tube end of preinsulated tubing.
Figure 5:
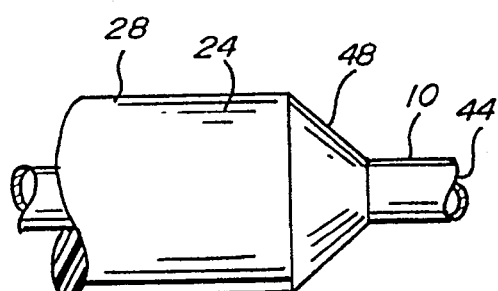
FIG. 5 is a front elevational prior art view of a partially sealed preinsulation end of a preinsulated tubing.
Figure 6:
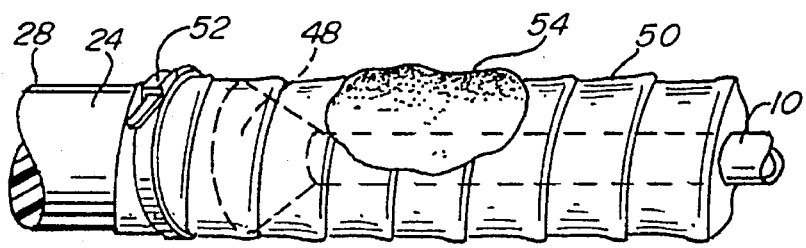
FIG. 6 is a front elevational prior art view of the tube end of a preinsulated tube spirally wrapped in insulation and partially sealed.
Figure 7:
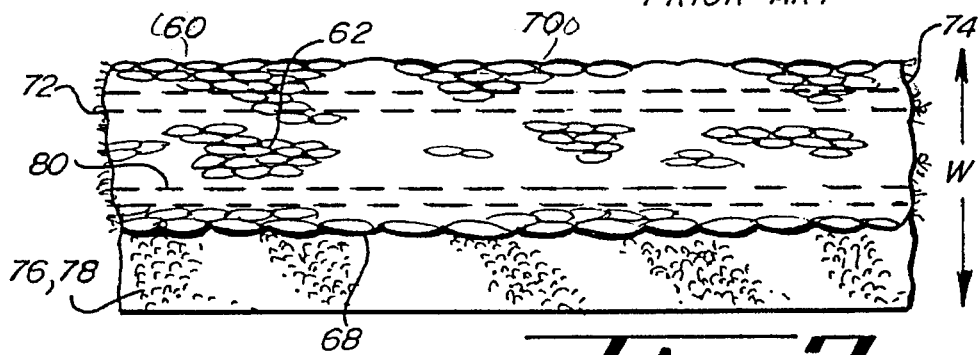
FIG. 7 is a front elevational view of the fiberglass jacket of the present invention.
Figure 9:
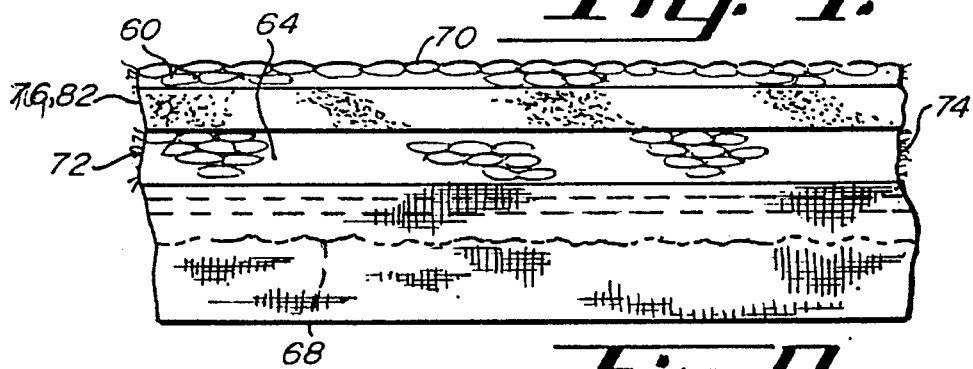
FIG. 9 is a rear elevational view of the fiberglass mat or jacket.
Figures 8, 10, 11:
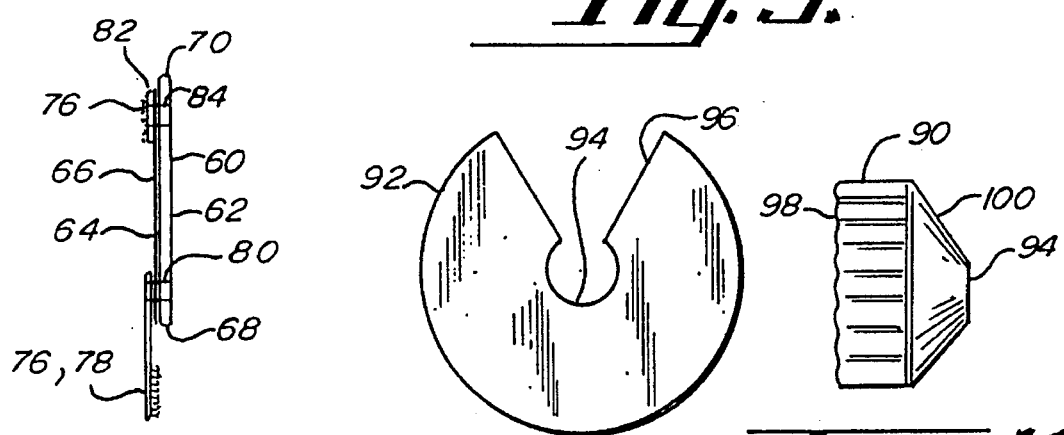
FIG. 8 is a side elevational view of the mat or jacket showing the fastening means in more detail together with a silicone sealing layer or coating.
FIG. 10 is a plan view of an aluminum blank for the frustum-shaped reducing adaptor of the present invention.
FIG. 11 is a side elevational view of the adaptor.

Referring to FIGS. 7 through 19, the fabric fiberglass mat or jacket 60 together with the frustum-shaped reducing adaptor 90 may be seen and understood in construction and use in sealably insulating tubing splices and ends.

More specifically, the fiberglass mat or jacket 60 illustratively may be on a roll approximating 3" wide and ¼" thick for ½" tubing 10. Please note that dimensions are for illustrative purposes only and are not to be deemed restrictive in interpretation. The mat 60 has an inside face 62 which will confront tube 10 and an outside face 64. Suitably the outside face 64 is sealed, such as with a silicone impregnate coating 66, to seal the mat 60 from moisture, water and harsh chemicals. The mat or jacket 60 has a first elongate side 68 and a second elongate side 70, and is suitably of a predetermined width (Arrow W) as previously described. Upon severing the mat 60 from a roll, it will then have a first short end 72 and an opposing second short end 74.

Fastening means 76 are suitably used with the invention. Applicant has found that hook and loop materials, such as Velcro, work well with this application. The hook material 78 is suitably affixed to the outside face 64 of the mat 60 appropriately along the first elongate side 68 and held thereat appropriately by stitching 80. A second complimentary loop material 82 is also on the outside face 64 and suitably adjacent or close to the second elongate side 70 and held thereat by stitching 84. Advantageously, the loop material 82 is spaced inward somewhat from the second elongate side 70 as to assure that the mat 60 will completely wrap around and overlap itself when insulating tubing 10.

The frustum-shaped reducing adaptor 90 is suitably made from an aluminum blank 92 which is punched to form the adaptor 90. The adaptor 90 has a central aperture 94 of a diameter only slightly larger than that of tubing 10. A pie slice 96 is removed from the blank 92 prior to punching to permit the adaptor blank to conform to its frustum shape. The adaptor 90 has a preinsulation engaging collar portion 98 which will readily fit over the preinsulation end 30. From the collar 98, the adaptor 90 has a necked-down or cone portion 100 and also has an overlapping portion 102 (Arrow O) to assure a complete seal about the preinsulation end 30. The preinsulation end collar portion 90 appropriately may be secured to the preinsulation end 30 suitably by a tie 108 or a screw 110. Unvulcanized silicone (Arrow S) will also secure the adaptor 90 after the silicone S has become vulcanized or cured.

In insulating tube splices 34 and bare tubing 10, the fiberglass jacket 60 may be utilized with or without the frustum-shaped reducing adaptor 90. Illustratively in FIGS. 16 through 19, the adaptor 90 is utilized. Initially, the adaptor 90 is fitted wherein tubing 10 extends through the central aperture 94 and the collar 98 is fitted over the preinsulation end 30. Unvulcanized silicone may be utilized to seal the adaptor 10 at the collar 98 and central aperture 94. A tie 108 or screw 110 may be utilized to temporarily or permanently secure the adaptor 90 in place. Thereafter, the fiberglass jacket 60 of a predetermined length may be wrapped in straight jacket fashion 112 shown in FIG. 17 with a small amount of unvulcanized silicone (Arrow S) used to seal the short ends 72 and 74 of the jacket 60 onto tubing 10. FIG. 18 clearly shows that the mat or jacket 60 overlaps itself as to assure that the fastening means 76 do not come in contact with the extreme heated or chilled tubing 10.

Alternatively, FIG. 19 shows that the fiberglass mat or jacket 60 may appropriately be spiral wrapped 114. Although this arrangement is possible, it does consume greater lengths of jacket 60 as opposed to the straight jacket fashion 112.

Referring to FIGS. 20 through 24, the fiberglass jacket or mat 60 may be seen to take another shape such as the polygonal fiberglass jacket 160. The fiberglass jacket 160 is generally polygonal in shape and has greater than four sides. However, the jacket 60 is rectangular in FIG. 22 over splice connectors 16 (not shown, but covered).

More specifically, the fiberglass jacket 160 has an inside face 162 and an outside face 164 with the optional silicone coating 66 as previously discussed. FIGS. 21 and 24 show the jacket 160 in an inside-out condition 167 where the outside face 164 is folded upon itself and the inside face 162 is directed outwardly. Stitching 169 is then made in the folded jacket 160. After the stitching 169 is completed, the fiberglass jacket 160 is then inverted to its outside-out condition 171 clearly shown in FIGS. 20 and 23. Along the peripheral edge 173 of the jacket 160 are located fastening means 176 which suitably may be hook material 178 fastened thereat by stitching 180 and loop material 182 attached thereat appropriately by stitching 184.

After the jacket 160 is inverted from its inside-out condition 167 to its outside-out condition 171, a cavity 185 is formed which will now permit the overlapping alignment of the hook and loop materials 178 and 182. Thereafter, as shown in FIGS. 20 and 23, the inside face 162 may be brought up to confronting relationship, while the cavity wraps around, the elbow splice connector 17 or the valve body 22 of the valve connector 20.

The jacket 160 actually overlaps itself somewhat and thereafter the fastening means 176 are releasably secured to securely insulate the connectors 17 and 20 with the fiberglass mat or jacket 160 from fire and to prevent an individual from otherwise being burned from contacting the connectors 17 and 20. The fiberglass jacket 160 may be removed by simply peeling away of the hook material 178 from the loop material 182.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

I claim:

1. A reusable insulation jacket for tubing elbow and valve connectors which conveys steam, hot materials, condensate, lubricants, cryogenic fluids and cold materials, the insulation jacket comprising:

(a) a reusable, flexible, one piece, single layer fiberglass fabric mat having an inside face, an outside face, mat portions, the outside face of some mat portions being folded upon the outside face of other mat portions, a peripheral edge, stitching along and through the inside face-out mat portions afterwhich the mat is inverted to an outside face-out condition forming a cavity bounded by the inside face; and (b) complimentary releasable fastening means fastened along the peripheral edge as to permit the inside face to confront, and the cavity to wrap around, one of the connectors and as to permit the fastening means to releasably interlock for securely holding the mat around the one connector so that the mat insulates the one connector with the fiberglass mat from fire and prevents an individual from otherwise being burned from contacting the connector.

2. The insulation jacket of claim 1, further comprising a sealant layer on the outside of the mat.

3. The insulation jacket of claim 2, wherein the sealant layer is silicone.

4. The insulation jacket of claim 1, wherein the fastening means comprises complementary hook and loop materials.

5. The insulation jacket of claim 1, wherein the outside face is folded upon itself and the stitching is along the inside face of the mat as to form the cavity as the outside face is inverted.

6. The insulation jacket of claim 1, wherein the jacket is polygonal having more than four sides.

7. A reusable insulation jacket for tubing, elbow and valve connectors which conveys steam, hot materials, condensate, lubricants, cryogenic fluids and cold materials, the insulation jacket comprising:

(a) a reusable, flexible, one piece, single layer fiberglass fabric mat having an inside face, an outside face with a silicone sealant layer thereon, confronting outside face mat portions, a peripheral edge, stitching along and through the confronting outside face mat portions afterwhich the fabric mat is inverted to an outside face-out condition forming a cavity bounded by the inside face; and (b) complimentary releasable fastening means fastened along the peripheral edge of outside face as to permit the inside face to confront, and the cavity to wrap around, one of the connectors as to permit the mat to overlap itself and as to permit the fastening means to releasably interlock for securely holding the mat around the one connector so that the mat insulates the one connector with the fiberglass mat from fire and prevents an individual from otherwise being burned from contacting the connector.

8. The insulation jacket of claim 7, wherein the fastening means comprises complimentary hook and loop materials.

9. The insulation jacket of claim 7, further comprising a silicone sealant placed on the mat ends adjacent the tubing.

10. The insulation jacket of claim 7, wherein the jacket is polygonal, having more than four sides.

11. A reusable insulation jacket for tubing, elbow and valve connectors which conveys steam, hot materials, condensate, lubricants, cryogenic fluids and cold materials, the insulation jacket comprising:

(a) a polygonal, reusable, flexible, one piece, single layer fiberglass fabric mat with greater than four sides having an inside face, an outside face, confronting outside face mat portions, a peripheral edge, stitching along and through the confronting outside face mat portions afterwhich the fabric mat is inverted to an outside face-out condition forming a cavity bounded by the inside face; and (b) complimentary releasable fastening means fastened along the peripheral edge as to permit the inside face to confront, and the cavity to wrap around, one of the tubing connectors as to permit the fastening means to releasably interlock for securely holding the mat around the one connector so that the mat insulates the one tubing connector with the fiberglass mat from fire and prevents an individual from otherwise being burned from contacting the connector.

12. The insulation jacket of claim 11, further comprising a sealant layer on the outside of the mat.

13. The insulation jacket of claim 12, wherein the sealant layer is silicone.

* * * * *

UNITED STATES PATENT AND TRADEMARK OFFICE
CERTIFICATE OF CORRECTION

PATENT NO. : 5,522,433
DATED : June 4, 1996
INVENTOR(S) : Noble A. Nygaard

It is certified that error appears in the above-identified patent and that said Letters Patent is hereby corrected as shown below:

Column 1, line 17, please delete the word "ill" and insert in its place --in--.

Signed and Sealed this

Thirteenth Day of May, 1997

Attest:

BRUCE LEHMAN

Attesting Officer     Commissioner of Patents and Trademarks